United States Patent [19] [11] 3,930,584
Davis et al. [45] Jan. 6, 1976

[54] BOAT LOADING DEVICE FOR HIGH TOP VEHICLES

[76] Inventors: Howard Davis; Euphemia M. Davis, both of R.F.D. No. 3, Plainfield, Ill. 60544

[22] Filed: Apr. 5, 1974

[21] Appl. No.: 458,448

[52] U.S. Cl. ................................ 214/450
[51] Int. Cl.² ............................. B60R 9/04
[58] Field of Search...... 214/450, 517; 224/42.03 R, 224/42.1 R, 42.1 H, 42.1 F

[56] References Cited
UNITED STATES PATENTS

| | | | |
|---|---|---|---|
| 3,045,849 | 7/1962 | Tweten | 214/450 |
| 3,311,246 | 3/1967 | Jones, Sr. | 214/450 |
| 3,478,908 | 11/1969 | Clark | 214/450 |
| 3,762,587 | 10/1973 | Longee, Sr. | 214/450 |

Primary Examiner—Robert R. Song
Assistant Examiner—Michael J. Forman
Attorney, Agent, or Firm—Clarence A. O'Brien; Harvey B. Jacobson

[57] ABSTRACT

An elongated support arm is provided and pivotally supported from an elevated portion of one marginal portion of a vehicle onto whose top a boat is to be placed. The support arm is pivoted to the vehicle for swaying movement of the arm about a horizontal axis generally parallelling the marginal portion of the vehicle from which it is supported between a lowered position with the free end of the arm inclined downwardly and outwardly for contact with the surface upon which the vehicle rests and a raised position with the free end of the arm swung upward to a position with the arm vertically disposed and the free end thereof generally aligned with the top of the vehicle onto which the associated boat is to be positioned. The elevated portion of the vehicle to which the support arm is pivotally attached is disposed at a height equal to at least one half the effective length of the support arm and the free end of the support arm includes mounting structure pivotally supported from the support arm and releasably anchorable to the upper marginal portion of a boat to be loaded on top of the vehicle.

8 Claims, 10 Drawing Figures

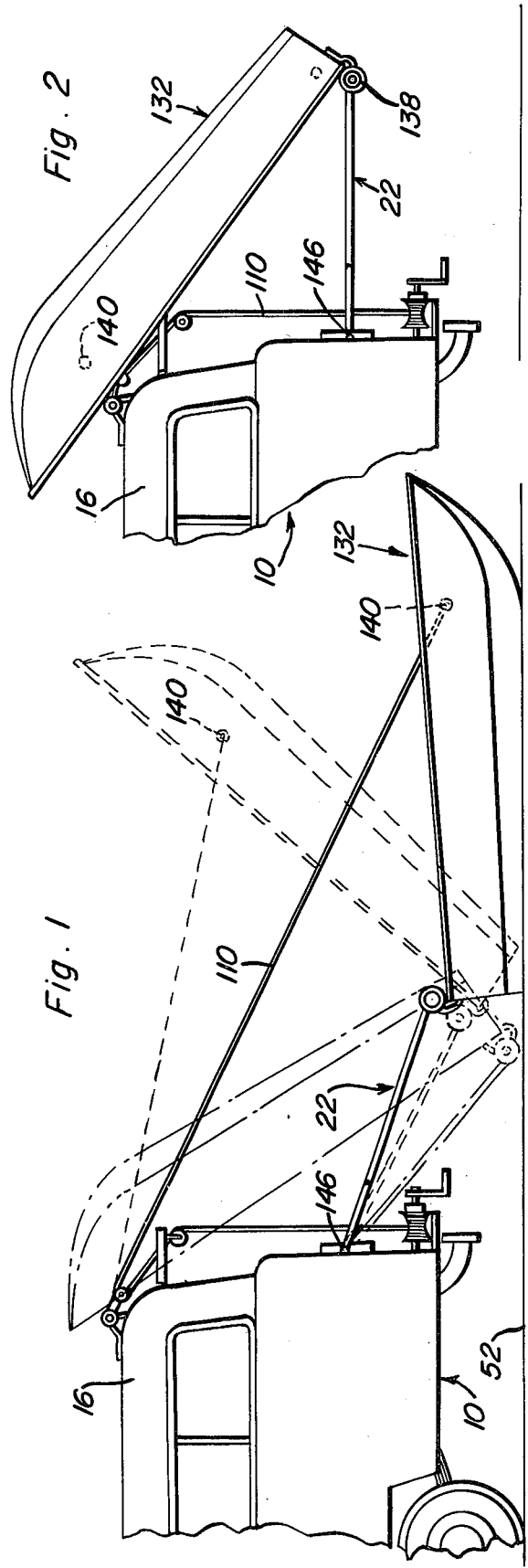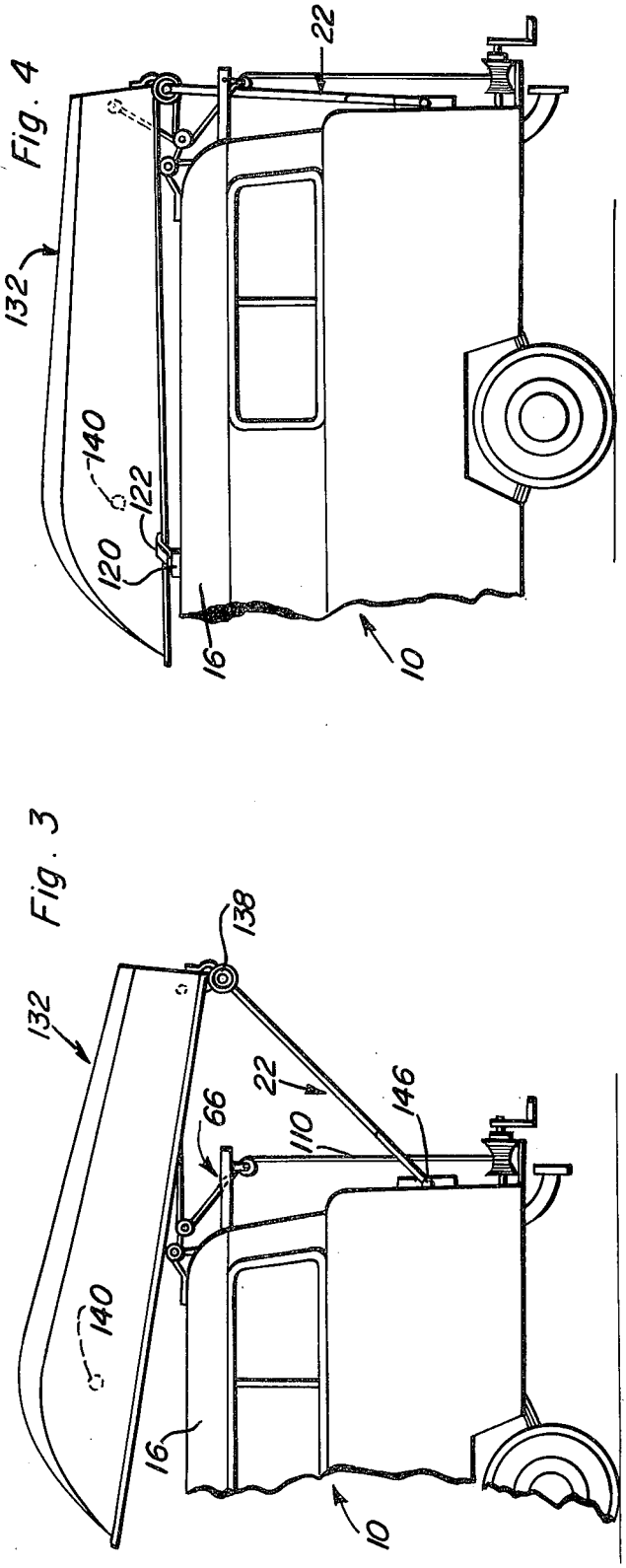

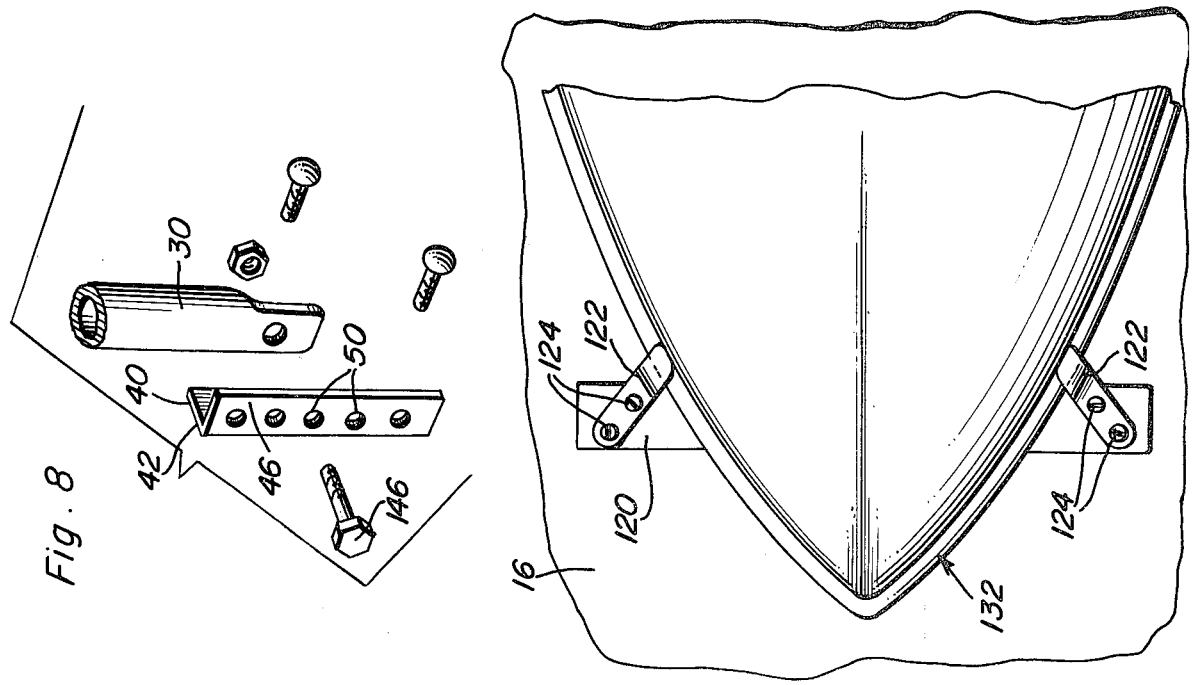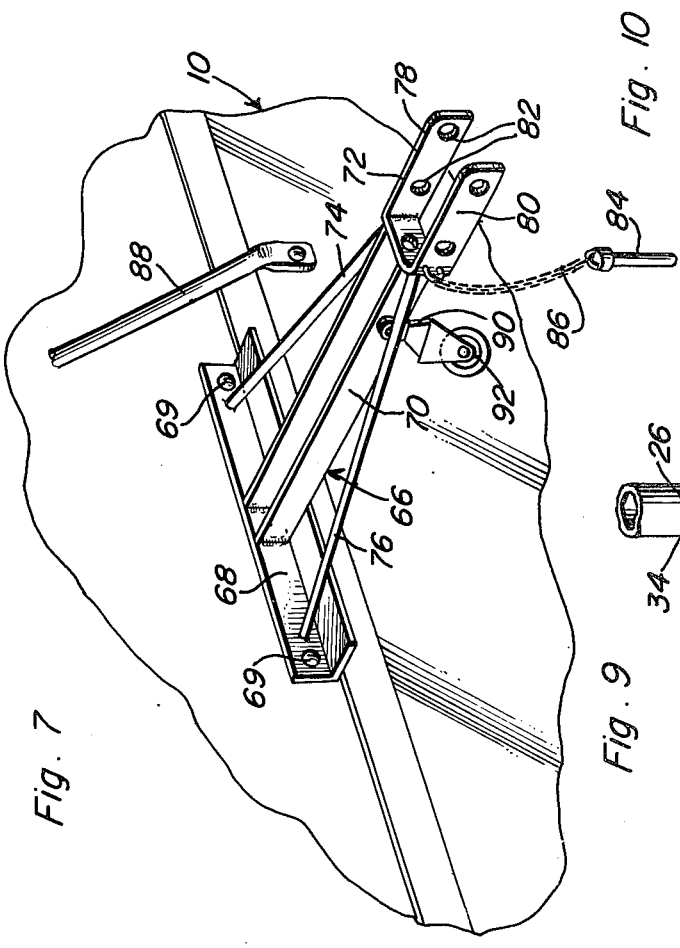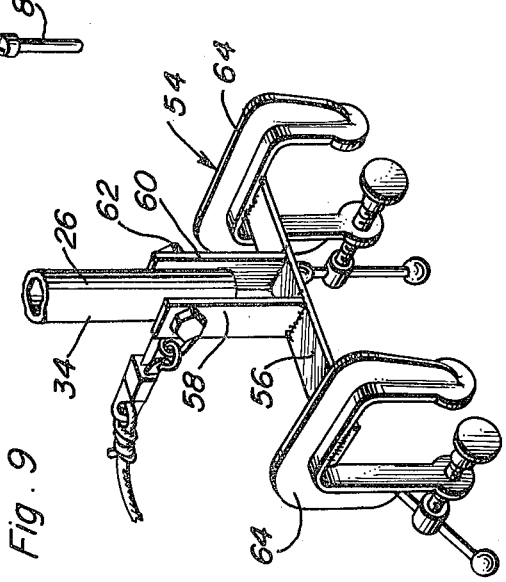

3,930,584

BOAT LOADING DEVICE FOR HIGH TOP VEHICLES

BACKGROUND OF THE INVENTION

Numerous devices have been heretofore designed for the purpose of unloading of a boat onto the top of a vehicle and unloading a boat from the top of a vehicle. Many of these devices have included elongated support arm structures pivotally supported from the associated vehicle at their base ends and adapted for releasable engagement with an associated boat at the free ends. Examples of these prior structures may be found in U.S. Pat. No. 2,584,163 to H. F. Squires, dated Feb. 5, 1952; U.S. Pat. No. 2,722,326 to A. M. Conroy, dated Nov. 1, 1955; U.S. Pat. No. 2,753,063 to W. T. Abel, dated July 3, 1956; U.S. Pat. No. 2,985,327 to C. R. Gilkison, dated May 23, 1961; U.S. Pat. No. 3,435,970 to F. J. Sutton, dated Apr. 1, 1969; and U.S. Pat. No. 3,612,314 to Eugene L. Cooper, dated Oct. 12, 1971.

While each of these previous devices are fully capable of assisting a boat onto the top of a vehicle and assisting the unloading of a boat from the top of the vehicle, some use support arms which are so long as to prevent their use if the space behind the associated vehicle is limited and others require considerable actuating structure or are so constructed as to place undue stresses upon the boat being loaded onto or unloaded from the associated vehicle.

The boat loading and unloading apparatus of the incident invention utilizes a somewhat conventional pivotally mounted elongated support arm. However, the length of the support arm and the elevation of its pivotal attachment relative to the associated vehicle is such as to limit the space rearward of the associated vehicle required during the boat loading and unloading process. Also, the length of the support arm structure and the height of its pivotal attachment to the associated vehicle enables the associated boat to be mounted onto the vehicle and unloaded from the vehicle in a manner which does not place undue stresses upon the boat. Still further, the boat loading apparatus of the instant invention is constructed in such a manner that only one person is needed to accomplish a boat loading or boat unloading operation.

The main object of this invention is to provide a boat loading device specifically designed for use in conjunction with high top vehicles and which will enable a single person to efficiently load a boat onto or unload a boat from a high top vehicle.

Another object of this invention in accordance with the immediately preceding object, is to provide a boat loading apparatus which will lessen the space requirements usually associated with similar boat loading devices.

Still another object of this invention is to provide a boat loading apparatus which will be effective in loading and unloading a boat in a manner such as undue stresses will not be placed upon the associated boat or the boat loading device.

A final object of this invention to be specially enumerated herein is to provide a boat loading device in accordance with the preceding objects which will conform to conventional forms of manufacture, be of simple construction and easy to sue so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of a high top vehicle with the boat loading apparatus of the instant invention mounted thereon and in operative association with a boat to be loaded onto the top of the vehicle, to alternate positions of the boat during the loading process being illustrated in phantom lines;

FIG. 2 is a fragmentary side elevational view similar to FIG. 1 but with the associated boat in a partially loaded position;

FIG. 3, is a side elevational view similar to FIGS. 2 and 3 but with the boat in an almost fully loaded position;

FIG. 4 is a fragmentary side elevational view similar to FIGS. 1, 2 and 3 with the boat in a fully loaded position;

FIG. 7 is a fragmentary perspective view of the vehicle illustrated in FIGS. 1–6 and showing the manner in which the support arm prop is supported and braced relative to the vehicle, the diagonal brace of the support arm prop being illustrated in exploded position;

FIG. 8 is a fragmentary perspective view of a portion of the mounting structure by which the support arm of the boat loading device is pivotally supported from the associated vehicles, with the various parts illustrated in exploded positions;

FIG. 9 is a fragmentary perspective view of the transom plan structure pivotally secured to the free end of the support arm structure;

FIG. 10 is a fragmentary top plan view of the vehicle and bower portion of the boat with the boat bow portion engaged with boat bow retaining structure supported from the forward portion of the top of the vehicle.

DETAILED DESCRIPTION OF THE INVENTION

Figure 6:
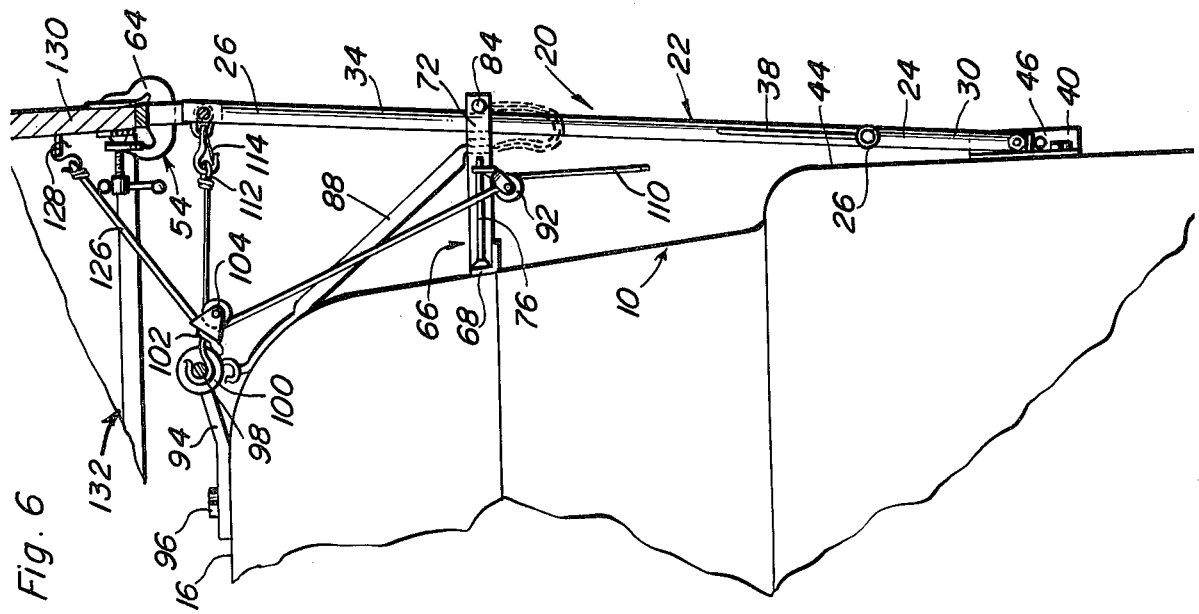
FIG. 6 is an enlarged fragmentary vertical sectional view taken substantially upon the plane indicated by the section lines 6—6 of FIG. 5.

Referring now more specifically to the drawings, the numeral 10 generally designates a conventional form of vehicle including opposite sides 12 and 14 and a high top 16. The rear of the vehicle 10 includes a rear bumper 18 and the boat loading apparatus of the instant invention is referred to in general by the reference numeral 20 and operatively associated with the rear of the vehicle 10 and the top 16 thereof.

The boat loading device 20 comprises an elongated support arm referred to in general by the reference numeral 22 and including a base end 24 and a free end 26. The base end 24 comprises a generally U-shaped member 26 including generally parallel legs 28 and 30 interconnected at one pair of corresponding ends by means of a bight portion 32 extending therebetween and secured thereto. The free end portion 26 of the support arm 22 comprises an elongated tubular member 34 having one end portion secured to the mid-portion of the bight portion 32 as at 36. In addition, the end of the tubular member 34 secured to the bight portion 32 is braced relative thereto by means of opposite side diagonal braces 38 secured to opposite sides of the tubular member 34 at one pair of corresponding ends and to the bight portion 32 at the other pair of ends thereof at spaced distances on opposite sides of the adjacent end of the tubular member 34.

A pair of angle brackets 40 are provided and include base flanges 42 and secured to the rear wall 44 of the vehicle 10 in any convenient manner as well as right angle outstanding mounting flanges 46 including vertically spaced bores 50.

From a comparison of FIGS. 1 and 4 of the drawings, it will be noted that the supporting arm 22 may be swung between a rearwardly and downwardly inclined lowered position for contact with the ground 52 on which the vehicle 10 rests and a raised position with the support arm 22 substantially vertically disposed. Also, from FIG. 9 of the drawings it may be seen that a clamp assembly referred to in general by the reference numeral 54 is pivotally attached to the free end 26 of the tubular member 34. The clamp assembly 54 comprises a horizontal mounting bar 56 from whose mid-portion a pair of spaced mounting flanges 58 and 60 are supported. The free end 26 of the tubular member 34 is pivotally secured between the free ends of the mounting flanges 58 and 60 by means of a pivot fastener 62. The opposite ends of the mounting bar 56 have a pair of C-clamps 64 of substantially conventional design welded thereto.

An abutment brace referred to in general by the reference numeral 66 is provided and includes an angle bracket mounting plate 69 secured to the rear wall 44 of the vehicle 10 by means of suitable fasteners 68. The brace 66 includes a U-shaped abutment arm 70 secured to and projecting rearwardly from the angle member 66 centrally intermediate its opposite ends and the rear end of the abutment arm 70 has a horizontally disposed rearwardly opening bifurcated mount 72 secured thereto. The mount 72 may be welded to the rear end of the abutment arm 70 and the rear end of the abutment arm 70 is braced relative to the opposite ends of the angle member 66 by means of diagonal braces 74 and 76. Further, the furcations 78 and 80 of the mount 72 are each provided with longitudinally spaced apertures 82 and latch pin 84 passage through aligned apertures 82 in the furcations 78 and 80 is tethered to the base end of the mount 72 by means of a chain 86. Further, a diagonal brace 88 is secured between the forward end of the mount 72 and the rear of the top 16 of the vehicle 10 in any convenient manner. Also, one side of the rear end portion of the abutment arm 70 as a pulley structure 90 secured thereto including a guide pulley wheel 92.

A pair of rearwardly and upwardly inclined mounting arms 94 have their forward ends secured to the rear portion of the top 16 by means of fasteners 96 and a support shaft 98 extends between and is secured to the rear ends of the support arms 94. Two sets of three rollers 100 each are journalled on opposite end portions of the shaft 98 and a pulley structure 102 is removably hook engaged with the center portion of the shaft 98 spaced between the opposite end sets of rollers 100 and includes a guide roller 104.

A winch assembly referred to in general by the reference 106 is anchored to and supported from one end of the bumper 18 and includes a crank driven rotatable winding member 108 about which one end of an elongated flexible tension member 110 is wound. The tension member 110 extends upwardly from the winding member 108 and passes over the roller 92 and thereafter over the roller 104. The free end of the tension member 110 is provided with an eye 112 with which a snap hook 114 carried by the free end 26 of the tubular member 34 is engaged.

With attention invited more specifically to FIG. 10 of the drawings, it may be seen that a forward portion of the roof 16 is provided with a transverse anchor member 120 secured thereto in any convenient manner and having a pair of clips 122 secured to its opposite ends by means of fasteners 124.

Figure 5:
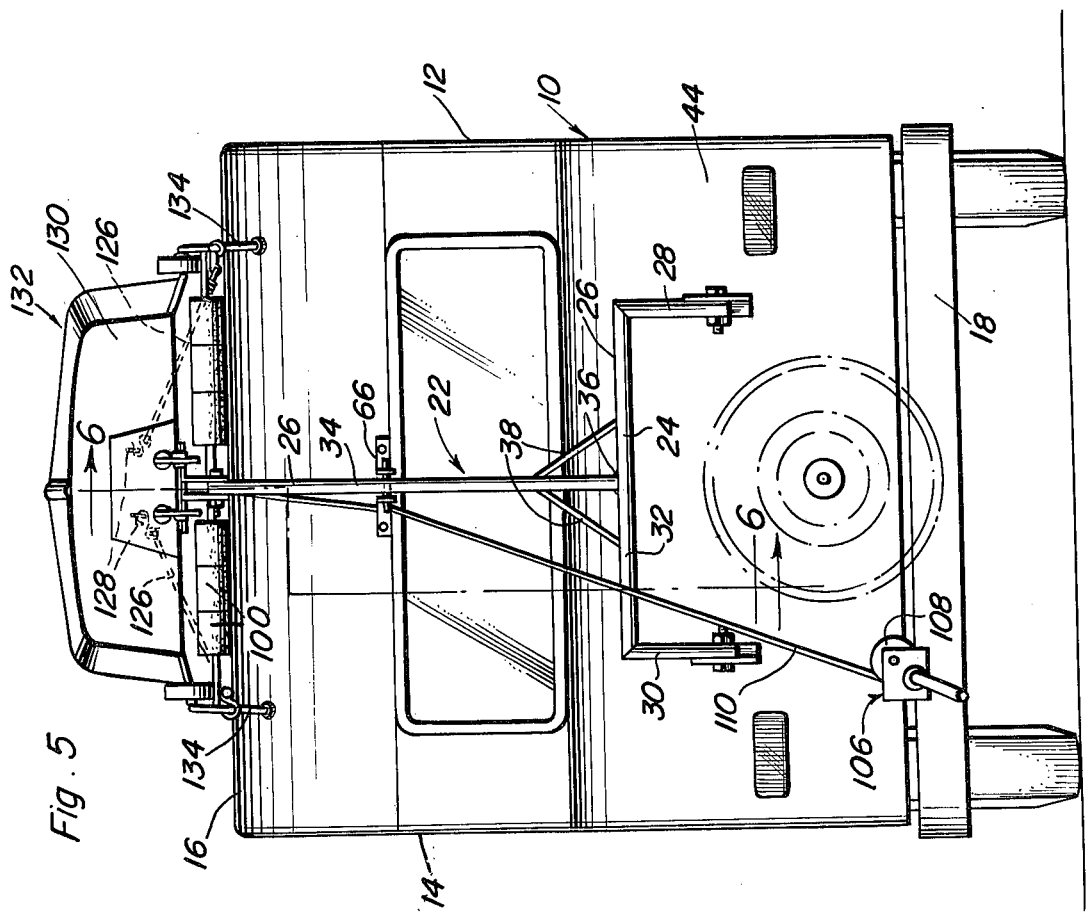
FIG. 5 is an enlarged rear elevational view of the vehicle and boat in the fully loaded position as seen from the right side of FIG. 4.

Also, from FIG. 5 of the drawings it may be seen that the opposite ends of a pair of elastic tension members 126 are anchored to suitable anchors 128 supported from the inner surface of the transom 130 of a boat referred to in general by the reference numeral 132, and also that the rear ends of the support arms 94 are braced relative to upper portions of the rear wall 44 by means of depending braces 134 still further opposite side portions of the upper marginal edge of the transom 130 of the boat 132 have support wheel assemblies 138 removably supported therefrom on opposite sides of the clamp assembly 54 which is clampingly engaged with the center portion of the transom 130. Still further, the bow portion of the boat 132 includes an anchor assembly 140. In operation, when it is desired to load the boat 132 onto the top 16 of the vehicle 10, the boat 132 is first positioned in an upright position spaced closely rearward of the vehicle 10 in the manner illustrated in solid lines in FIG. 1 of the drawings. Then, with the support arm 22 swung to a downwardly and rearwardly inclined lowered position, the clamp assembly 54 is clamped to the center of the transom 130 and the free end of the tension member 110 is anchored to the anchor 140 within the bow portion of the boat 132. Then, the winch 106 is actuated to pull the bow portion of the boat 132 through the intermediate phantom line position illustrated in FIG. 1 with the boat 132 inclined rearwardly and upwardly at its forward end and to the over center phantom line position illustrated in FIG. 1 with the inverted bow of the boat engaging the rollers 100 on the shaft 98. Then, the free end of the tension member 110 is released from the anchor 140 and anchored to the snap hook 114 carried by the free end of the tubular member 34. Thereafter, the winch 106 is further actuated to pull the free end of the support arm 22 through the positions thereof illustrated in FIGS. 2 and 3 of the drawings to the position thereof illustrated in FIG. 4 of the drawings with the opposite side gunnel portions of the bow of the boat 132 received between the raised inner adjacent ends of the clips 122. Thereafter, the elastic tension members 126 have their ends remote from the transom 130 hooked with the braces 134 and the pin 84 is passed through aligned apertures 82 behind the tubular member 34, the latter being embracingly received in the bifurcated mount 72 between the furcations 78 and 80 thereof.

With the boat 132 thus loaded onto the vehicle 10, the boat is securely fastened over the top 16 of vehicle 10. Of course, when it is desired to unload the boat 132, the elastic tension members 126 are released from engagement with the braces 134 and the pin 84 is withdrawn. Thereafter, the winch assembly 116 is slightly backed off and a rearward pull is exerted on the upper end of the support arm 22 in order to slightly rearwardly displace the boat 132. Thereafter, with a further rearward pull being exerted on the upper end of the tubular member 34 and the winch assembly 106 controlling the unwinding of the tension 110 from the winding member 108, the boat is lowered through the positions thereof as illustrated in FIGS. 3 and 2 of the drawings. Subsequently, after the boat has been lowered to the left-hand phantom line position thereof as illustrated in FIG. 1 of the drawings, a rearward thrust is exerted on the upper end of the boat 132 while continuing to control the unwinding of the tension member 110 until the boat 132 reaches a vertical center position at which point further rearward and downward swaying of the bow of the boat 132 is controlled solely by operation of the winch assembly 106.

From FIGS. 1, 2 and 3 of the drawings, it will be seen that the elevation of the pivot fasteners 146 by which the legs 28 are pivotally supported from the mounting flanges 46 is in excess of one half the effective length of the support arm 22. In this manner, the rearward extent of boat 132 behind the vehicle 10 as illustrated in solid lines in FIG. 1 is limited and a much shorter boat may be engaged with the free end of the support arm 22 and yet still be capable of having its bow portion rest against the rollers 100 in the manner illustrated in the left-hand phantom lined position of FIG. 1. Also, by the limited length of the support arm 22, the inclination of the boat 132 in the left-hand phantom line position of FIG. 1 from the vertical is limited.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle including a high top, a boat loading device comprising an elongated support arm, means pivotally supporting one end of said support arm from an elevated portion of one marginal portion of said vehicle for swinging movement of said arm about a horizontal axis generally paralleling said marginal portion between a lowered position with the other end of said arm inclined downwardly and outwardly for contact with the surface upon which said vehicle rests and a raised position with said other end of said arm swung upwardly to a position generally horizontally aligned with said top, said elevated portion of said vehicle being disposed at a height equal to at least one-half the effective length of said support arm, said other end of said support arm including mounting means adapted for pivotal connection to an upper portion of the transom of a boat.

2. The combination of claim 1 wherein said mounting means comprises a clamp assembly adapted to clampingly engage the upper portion of said transom pivotally supported from said other end of said arm for rotation about a horizontal axis generally paralleling the first mentioned axis.

3. The combination of claim 1 including an abutment bracket supported from said marginal portion below said top and above said elevated portion for abutment by a mid-portion of said arm to limit swinging toward said raised position, said abutment bracket and mid-portion of said arm including coacting retaining means releasably retaining said support arm in said raised position.

4. The combination of claim 1 including an elongated horizontal roller assembly supported from said top and extending along said marginal portion and adapted to rollingly support opposite side gunnel portions of an inverted boat being lengthwise advanced transversely of said roller assembly.

5. The combination of claim 4 including tension member guide means carried by said roller assembly and having an elongated flexible tension member engaged therewith for lengthwise guided shifting relative thereto, one end of said tension member being provided with anchor means adapted for selective anchoring to said other end of said arm and the bow portion of a boat disposed horizontally outwardly from the said other end of said arm when said other end is pivotally connected, by said mounting means to said upper transom portion.

6. The combination of claim 5 including a winding member carried by said marginal portion below said elevated portion to which the other end of said tension member is connected.

7. The combination of claim 6 including an abutment bracket supported from said marginal portion below said top and above said elevated portion for abutment by a mid-portion of said arm to limit swinging toward said raised position, said abutment bracket and mid-portion of said arm including coacting retaining means releasably retaining said support arm in said raised position, second tension member guide means carried by said abutment bracket below and outwardly of a vertical plane containing the first mentioned guide means and with which the portion of said tension member extending between said winding member and the first mentioned guide means is guidingly engaged for lengthwise shifting relative thereto.

8. In combination with a vehicle including a high top, a boat loading device including an elongated support device comprising an elongated support arm, means pivotally supporting one end of said support arm from an elevated portion of one marginal portion of said vehicle for swinging movement of said arm about a horizontal axis generally paralleling said marginal portion between a lowered position with the other end of said arm inclined downwardly and outwardly for contact with the surface upon which said vehicle rests and a raised position with said other end of said arm swung upwardly to a position generally horizontally aligned with said top, said other end of said support arm including mounting means adapted for pivotal connection to an upper portion of the transom of a boat, an abutment bracket supported from said marginal portion below said top and above said elevated portion for abutment by a mid-portion of said arm to limit swinging toward said raised position, said abutment bracket and mid-portion of said arm including coacting retaining means releasably retaining said support arm in said raised position, an elongated horizontal roller assembly supported from said top and extending along said marginal portion and adapted to rollingly support opposite side gunnel portions of an inverted boat being lengthwise advanced transversely of said roller assembly, a pulley journaled from said roller assembly and having the mid-portion of an elongated flexible tension member passed thereover for lengthwise guided shifting relative thereto, one end of said tension member being provided with anchor means adapted for selective anchoring to said other end of said arm and the bow portion of a boat disposed horizontally outwardly from the said other end of said arm when said other end is pivotally connected, by said mounting means to said upper transom portion, a winding member carried by said marginal portion below said elevated portion and to which the other end of said tension member is connected, and a second tension member guide pulley journaled from said abutment bracket below and outwardly of a vertical plane containing the first mentioned guide means and over which the portion of said tension member extending between said winding member and the first mentioned guide means is guidingly engaged for lengthwise shifting relative thereto.

* * * * *